(12) United States Patent
Yajima

(10) Patent No.: US 6,238,576 B1
(45) Date of Patent: May 29, 2001

(54) CHEMICAL LIQUID SUPPLY METHOD AND APPARATUS THEREOF

(75) Inventor: Takeo Yajima, Musashino (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 09/415,621

(22) Filed: Oct. 12, 1999

(30) Foreign Application Priority Data

Oct. 13, 1998 (JP) .................................................. 10-290525

(51) Int. Cl.[7] .................................................. C02F 1/20
(52) U.S. Cl. ................... 210/767; 210/194; 210/416.1; 210/472; 210/805; 417/53; 417/283; 417/313; 222/251; 96/155; 95/241
(58) Field of Search .................................... 210/138, 141, 210/143, 194, 416.1, 739, 767, 805, 436, 472; 417/2, 53, 283, 290, 302, 313, 383, 385, 388, 188; 222/1, 251, 255; 95/241, 242; 96/155, 176

(56) References Cited

U.S. PATENT DOCUMENTS

| | | | |
|---|---|---|---|
| 4,690,621 | * 9/1987 | Swain | 210/416.1 |
| 4,915,597 | * 4/1990 | Moore | 210/416.1 |
| 4,983,102 | * 1/1991 | Swain | 417/313 |
| 5,262,068 | * 11/1993 | Bowers et al. | 210/767 |
| 5,490,765 | 2/1996 | Bailey et al. | 417/2 |
| 5,527,161 | 6/1996 | Bailey et al. | 417/53 |
| 5,772,899 | * 6/1998 | Snodgrass et al. | 417/313 |

* cited by examiner

Primary Examiner—Joseph W. Drodge
(74) Attorney, Agent, or Firm—McCormick, Paulding & Huber LLP

(57) ABSTRACT

Impure portions such as air bubbles and gelled portions in a liquid are removed so that the liquid can be discharged with improved cleanliness. Under condition that a return flow path and a liquid discharge flow path are closed, a pump chamber is expanded, thereby sucking the liquid in a liquid container portion into a pump chamber through a filter. Under condition that a vent port of the filter and the return flow path are opened and a liquid introducing flow path, the liquid discharge flow path, and a pump inlet flow path are closed, the pump chamber is contracted, thereby returning the liquid in the pump chamber toward the filter so that air in the filter is exhausted to the outside. Under condition that the return flow path and the pump inlet flow path are closed, the pump chamber is contracted, thereby discharging the liquid from the nozzle.

11 Claims, 10 Drawing Sheets a sucking operation an exhausting operation a sucking operation a feedback operation a re-sucking operation

CHEMICAL LIQUID SUPPLY METHOD AND APPARATUS THEREOF

BACKGROUND OF THE INVENTION

The present invention relates to a chemical liquid supply technique of discharging a predetermined amount of liquid from a chemical liquid or the like, which is preferably used to coat a processing liquid such as a photoresist liquid or the like onto a surface of a semiconductor wafer.

Chemical liquid such as photoresist liquid, spin on glass liquid, polyimide resin liquid, pure water, developing liquid, etching liquid, washing liquid, organic solvent, and the like are used in manufacturing processes in various technical fields such as techniques of manufacturing a liquid crystal board, a magnetic disk, a multi-layered wiring board, and the like, starting from a semiconductor wafer manufacturing technique.

For example, in case of coating a photoresist liquid onto the surface of the semiconductor wafer, the photoresist liquid is dropped onto the surface of the semiconductor wafer from a nozzle, after having rotated the semiconductor wafer in the horizontal plane. In a chemical liquid supply apparatus used for coating this kind of photoresist liquid, a filter is provided to eliminate air bubbles and foreign substances in the photoresist liquid. If a portion of the photoresist liquid contained in a liquid tank is gelled, this gelled portion becomes a foreign substance. If the gelled foreign substance is coated onto the semiconductor wafer, the manufacturing yield on the semiconductor integrated circuit device is deteriorated.

In a conventional chemical liquid supply apparatus, there is provided a pump of a variable volume type which is constructed by an elastically deformable tube or a bellows, in order to discharge a predetermined amount of liquid from a photoresist liquid or the like. In the conventional chemical liquid supply apparatus having this kind of pump, a filter is provided in the secondary side of the pump, or in the discharging side, so that the liquid is permeated through the filter by discharging pressure of the pump. The filtered liquid is dropped from the nozzle provided in the secondary side of the filter (for example, U.S. Pat. No. 5,527,161 and 5,490,765).

Thus, in case where a filter is provided in the secondary side of a pump, a liquid is filtered by the filter when the liquid is discharged from a nozzle in accordance with the discharging operation of the pump. Therefore, the flow rate or flow velocity of the liquid from the nozzle is equal to the flow rate or flow velocity during filtering within the filter.

The photoresist liquid is gelled sometimes. If the photoresist liquid including a gelled portion is coated on a semiconductor wafer, the manufacturing yield on semiconductor integrated circuit devices is lowered. Likewise, if the photoresist liquid with air bubbles is coated, the yield is lowered. A filter is provided in order to capture the gelled portion and air bubbles. By the type of the photoresist liquid and the discharged amount thereof, that the gelled portion and air bubbles pass through the filter in some cases. That is, if the discharge velocity of the liquid discharged from the pump is set in correspondence with the discharge velocity of the from the nozzle and if a chemical liquid is supplied to the filter at the discharge velocity, air bubbles or a gelled portion of the liquid also permeates through the filter in some cases.

As a result of experiments, since chemical liquids such as a photoresist liquid and the like have different viscosities and the like depending on the types of the chemical liquids. Therefore, it has been found that there are optimum discharge flow rates from the nozzle which are respectively inherent to the types of the chemical liquids, as well as optimum permeation flow rates through the filter which are also respectively inherent to the types of the chemical liquids. It has also been found that if the permeation flow rate of the chemical liquid which is let permeate through the filter is set to be smaller than the discharge flow rate from the nozzle, it is possible to effectively capture portions of impure quality such as portions gelled by the filter and air bubbles.

SUMMARY OF THE INNVENTION

An object of the present invention is to provide a chemical liquid supply method and a chemical liquid supply apparatus which remove impure portions such as air bubbles and gelled portions from the liquid, so that a liquid can be discharged with improved cleanliness.

According to the present invention, a chemical liquid supply method using a chemical supply apparatus includes a filter communicating with a liquid container portion through a liquid introducing flow path connected to a filter inlet, a pump having a pump chamber which is connected to a filter outlet through a pump inlet flow path and is expanded/contracted, a liquid discharge portion connected to a pump outlet through a liquid discharge flow path, and a return flow path which returns a liquid discharged from the pump, to a side of the liquid introducing flow path, the chemical liquid supply method comprising a sucking step of expanding the pump chamber, thereby sucking a liquid contained in the liquid container portion, into the pump chamber through the filter, under condition that the return flow path and the liquid discharge flow path are closed, an exhausting step of contracting the pump chamber, thereby returning the liquid contained in the pump chamber to a side of the filter for exhausting externally air contained in the filter, under condition that a vent port of the filter and the return flow path are opened and the liquid introducing flow path, the liquid discharge flow path, and the pump inlet flow path are closed, and a discharging step of contracting the pump chamber, thereby discharging the liquid from the liquid discharge portion, under condition that the return flow path and the pump inlet flow path are closed.

The discharging step may be carried out after the sucking step and the exhausting step are repeated a plurality of times.

According to the present invention, a chemical liquid supply method using a chemical supply apparatus includes a filter communicating with a liquid container portion through a liquid introducing flow path connected to a filter inlet, a pump having a pump chamber which is connected to a filter outlet through a pump inlet flow path and is expanded/contracted, a liquid discharge portion connected to a pump outlet through a liquid discharge flow path, and a return flow path which returns a liquid discharged from the pump, to a side of the liquid introducing flow path, the chemical liquid supply method comprising a sucking step of expanding the pump chamber, thereby sucking a liquid contained in the liquid container portion, into the pump chamber through the filter, under condition that the return flow path and the liquid discharge flow path are opened, a feedback step of contracting the pump chamber, thereby feeding back the liquid contained in the pump chamber to a side of the liquid introducing flow path, under condition that the return flow path and the liquid introducing flow path are opened and the liquid discharge flow path and the pump inlet flow path are closed, a re-sucking step of expanding the pump chamber, thereby sucking the liquid fed back in the liquid introducing flow path, again through the filter into a side of the pump chamber, under condition that the return flow path and the liquid discharge flow path are closed, and a discharging step of contracting the pump chamber, thereby discharging the liquid from the liquid discharge portion, under condition that the return flow path and the pump inlet flow path are closed.

The feedback step and the re-sucking step may be repeated between the discharging step and next discharging step thereof which are carried out at a predetermined interval.

And, a suck-back step of expanding the pump chamber, thereby returning the liquid into the liquid discharge portion may be performed under condition that the liquid discharge flow path is opened after carrying out the discharging step.

According to the present invention, a chemical liquid supply apparatus comprises a pump having a pump chamber which is expanded/contracted, sucking a liquid from a pump inlet into the pump chamber when the pump chamber is expanded, and discharging the liquid from a pump outlet when the pump chamber is contracted a filter having a filter inlet and a filter outlet, the filter inlet communicating with a liquid container portion containing the liquid through a liquid introducing flow path, and the filter outlet being connected to a pump inlet flow path connected to the pump inlet a liquid discharge portion connected to a liquid discharge flow path connected to the pump outlet, for discharging the liquid, and control means for independently controlling a pump operation speed of expanding the pump chamber to suck a liquid passing through the filter toward the pump chamber, and a pump operation speed of contracting the pump chamber to discharge the liquid from the pump outlet.

An chemical liquid supply apparatus further comprises a return flow path for returning the liquid discharged from the pump, into a side of the filter, wherein the liquid is returned into the filter through the return flow path, and thereby, air captured in the filter may be exhausted externally.

And an chemical liquid supply apparatus further comprises a return flow path for returning the liquid discharged from the pump, into a side of the filter, wherein after the liquid is fed back into a side of the liquid introducing flow path through the return flow path, the liquid fed back may permeate again through the filter, thereby circulating and filtering the liquid.

According to the present invention, a chemical liquid supply apparatus further comprises chemical liquid supply units in which the pump, the filter, and a pump drive section for driving the pump are incorporated, and a mother board provided with a flow path connecting portion which is connected to a joint portion of each of a liquid introducing flow path, a liquid discharge flow path, and an exhaust flow path, which are provided for each of the chemical liquid supply units, wherein each of the chemical liquid supply units can be integrally attached to the mother board.

An chemical liquid apparatus further comprises a pipe connecting port connected in common to a pipe connecting portion provided for each of the chemical liquid supply units is provided on the mother board, and a common connector connected in common to a connector electrically connected to an electric equipment portion in each of the chemical liquid supply units is provided on the mother board.

According to the present invention, a filter is provided on the primary side of a pump, and a liquid is filtered during the sucking operation of the pump. During the discharging operation, the liquid does not pass through the filter. As a result of this, the flow speed of the liquid filtered after passing through the filter and the discharge flow speed of the liquid discharged from the liquid discharge portion can be set to differ from each other. By making the flow speed lower than the discharge flow speed, the sucking operation of the pump can be performed slowly, so that the impure portions such as gelled portions and air bubbles can be prevented from permeating through the filter.

In this manner, an extent of the cleanliness of the discharged liquid can be improved. If the chemical liquid supply technique of the present invention is adopted in the step of manufacture a semiconductor integrated circuit device, the manufacturing yield on semiconductor integrated circuit devices can be improved.

By returning the liquid discharged from the pump to the filter through a return path with use of one single pump, it is possible to exhaust securely air bubbles contained in the liquid with a simple structure.

Since the pump operation speed for permeating the liquid through the filter and the pump operation speed for discharging the liquid from the pump outlet can be controlled independently, it is possible to obtain an accurate discharged from amount or an accurate discharge flow rate without being influenced from pressure loss caused by the filter. In addition, the speed of the liquid passing through the filter and the discharge speed of the liquid discharged from a discharge portion can be separately set to optimum values, respectively.

After the liquid which has passed from the liquid introducing flow path through the filter returns through the return flow path to the liquid introducing flow path, since circulation filtering operation for permeating the liquid through the filter again is repeated a plurality of times, gelled portions and air bubbles can be securely removed by the filter. So, a high quality liquid without containing impure portions such as air bubbles can be discharged.

Also, since a plurality of chemical liquid supply units layered or integrated onto a mother board can be detachably attached, the space on the mother board can be improved efficiently by connecting pipes concentrated onto the mother board. In addition, several lines that can be used in common among various lines such as power lines, signal lines, gas lines, liquid lines, and the like provided in form of one system with respect to the mother board.

DESCRIPTION OF THE PREFFERED EMBODIMENTS

In the following, embodiments of the present invention will be specifically explained on the basis of the drawings.

Figure 1:
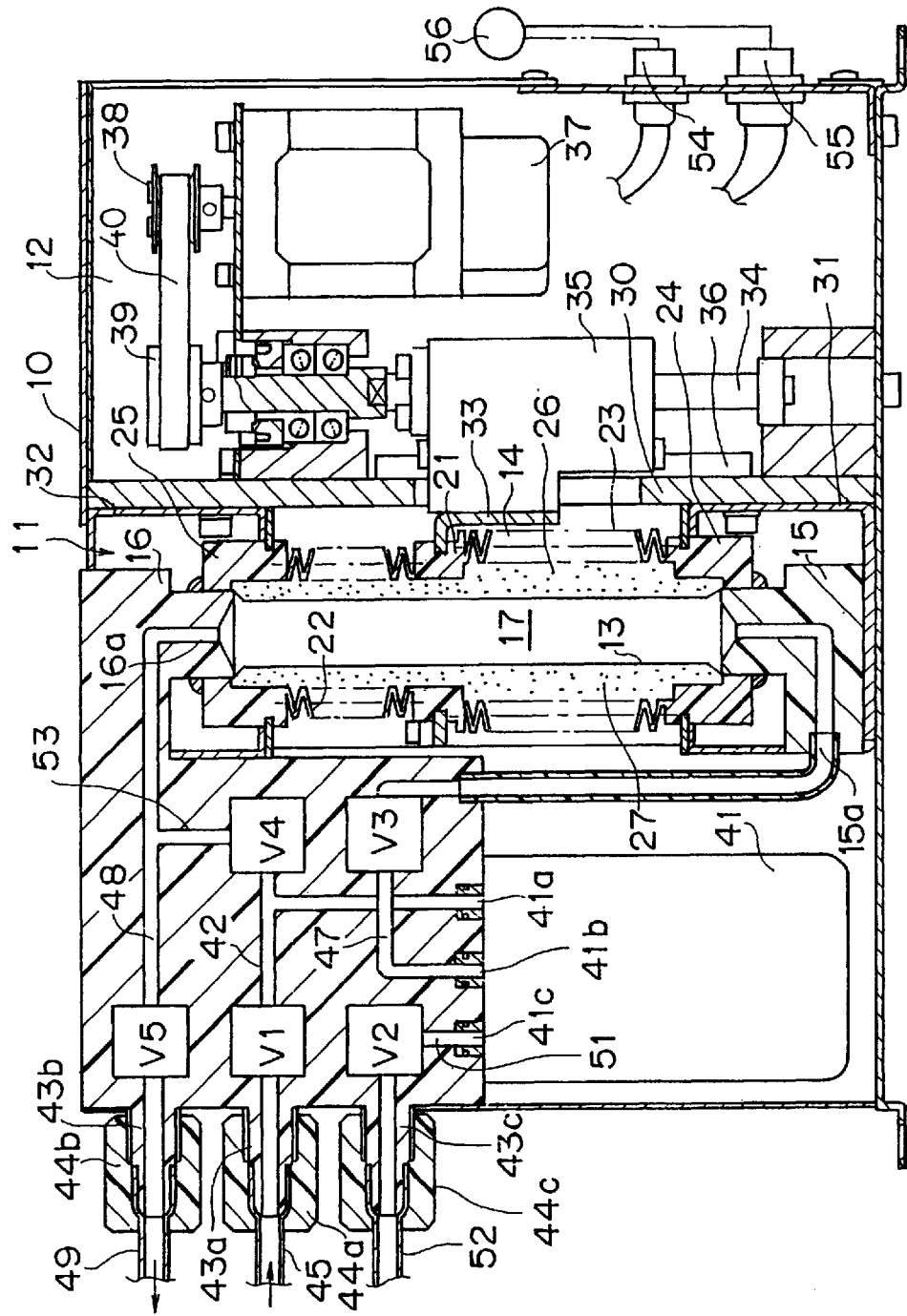
FIG. 1 is a cross-sectional view showing a chemical liquid supply apparatus as an embodiment of the present invention.
Figure 2:
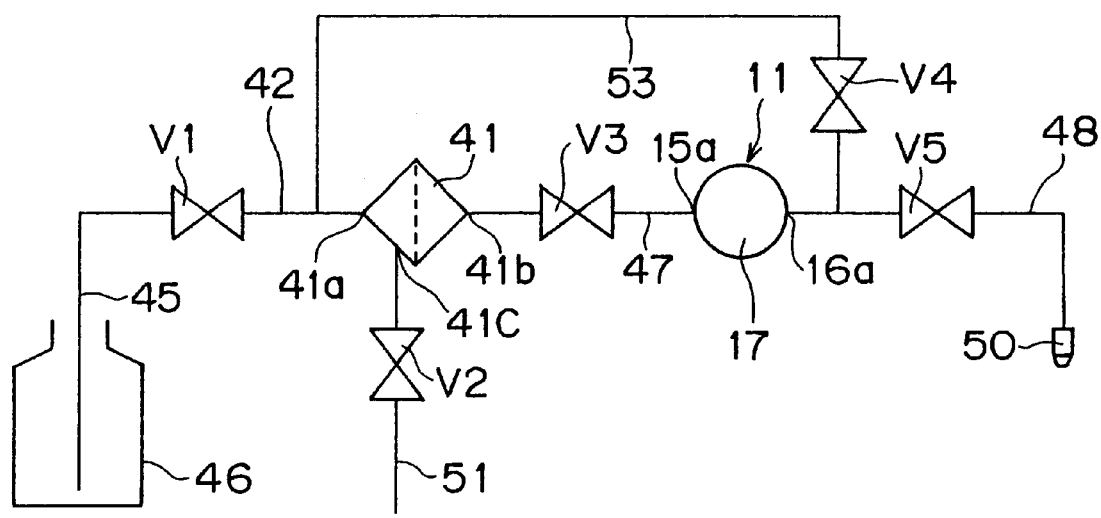
FIG. 2 is a liquid circuit diagram schematically showing flow of liquid in the chemical liquid supply apparatus shown in FIG. 1.
Figure 3:
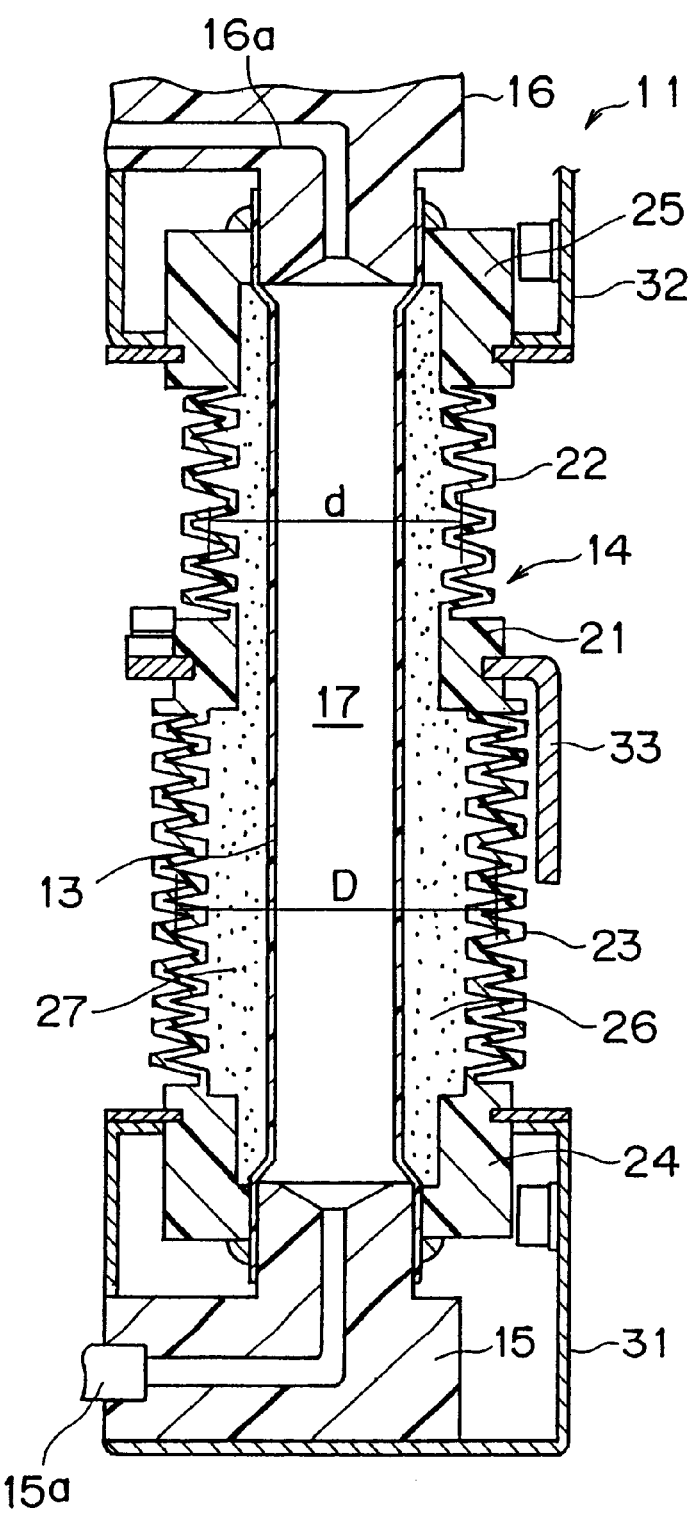
FIG. 3 is an enlarged cross-sectional view of a pump shown in FIG. 1.

FIG. 1 is a cross-sectional view showing a chemical liquid supply apparatus as an embodiment of the present invention. FIG. 2 is a liquid circuit diagram schematically showing flow of a liquid in the chemical liquid supply apparatus shown in FIG. 1. FIG. 3 is an enlarged cross-sectional view of a pump section shown in FIG. 1.

This chemical liquid supply apparatus has a pump 11 and a pump drive section 12 which are assembled in a housing 10. The pump 11 comprises a flexible tube 13 which is made of an elastic material and is elastically expandable and contractible in the radial direction, and a bellows 14 which is provided outside the tube and is made of an elastic material to be elastically deformable in the axial direction.

An inlet-side adapter 15 is attached to an end portion of the flexible tube 13, and an outlet-side adapter 16 is attached to another end portion of the tube 13. A pump chamber 17 is formed inside of the flexible tube 13 between the adapters 15 and 16.

The bellows 14 has an operating disk portion 21 at the center portion in the axial direction, a small bellows portion 22 having an effective diameter d, and a large bellows portion 23 having an effective diameter D larger than the effective diameter d. Both of the bellows portions 22 and 23 are integrated with each other on both sides of the operating disk portion 21. A fixed disk portions 24 and 25 are provided to be integral with both end portions of the bellows 14, respectively. The inlet-side adapter 15 is fixed at the fixed disk portion 24 in a side of the large bellows portion 23 by the flexible tube 13, and the outlet-side adapter 16 is formed at the fixed disk portion 25 in a side of the small bellows portion 22 by the flexible tube 13.

Since the chemical liquid supplied in Figures is a photoresist liquid, the flexible tube 13 is made of a tetrafluoroethyleneperfluoroalkylvinylether copolymer (PFA) belonging to fluororesin so as to have no reaction to the chemical liquid. The adapters 15 and 16 are also made of a similar material, respectively. Also, the bellows 14 is made of a similar material such that the disk portions 21, 24, and 25 and the bellows 22 and 23 are integral with one another. However, if being elastic material, the resin material is not limited to PFA. Likewise, another resin material can be used for the flexible tube 13 and the bellows 14. In addition, the flexible tube 13 and the bellows 14 can be formed to be integral with each other. In this case, the adapters 15 and 16 are not necessary. Further, the bellows 14 may be made of metal.

The space between the flexible tube 13 and the bellows 14 provided outside the tube 13 serves as a drive chamber 26, and an incompressible medium 27 such as liquid is filled in the drive chamber 26. Therefore, when the bellows 14 is elastically deformed in the axial direction by the operating disk portion 21 of the center portion, the volume inside the small bellows portion 22 and the large bellows portion 23 changes without changing the whole length of the bellows 14. As a result of this, the flexible tube 13 is expanded and compressed in the radial direction, i.e., the lateral direction by the incompressible medium 27, so that the pump chamber 17 of the flexible tube 13 performs pumping operation. The structure of the pump 11 shown in FIG. 3 is basically similar to structure described in the Japanese Patent Application Laid-Open No. 10-61558 proposed by the present applicant, and the cross-sectional shape of the flexible tube 13 can be various shapes such as an ellipse, a circle, a heteromorphy, and the like.

A support base 30 is fixed in the housing 10, and a fixed bracket 31 fixed on the support base 30 is engaged in the fixed disk portion 24. A fixed bracket 32 fixed on the support base 30 is engaged in the fixed disk portion 25. The bellows 14 is attached to the support base 30 at respective fixed disk portions 24 and 25.

To perform the pumping operation by shifting the operating disk portion 21 in the axial direction, an operating bracket 33 engaged in the operating disk portion 21 is linked with a ball nut 35. The ball nut 35 is screwed on a ball screw shaft 34 which extends in parallel with and is rotatably attached to the bellows 14. The ball nut 35 is slidably engaged with the guide rail 36 provided on the support base 30. The ball nut 35 is driven in the axial direction as the ball screw shaft 34 is rotated. To rotate and drive this ball screw shaft 34, a belt 40 is equipped between a pulley 38 fixed to the shaft of a motor 37 attached to the support base 30 and a pulley 39 fixed to the ball screw shaft 34.

A filter 41 can be detachably inserted into the housing 10. A liquid introducing flow path 42 is connected to a filter inlet 41a of this filter 41 in the housing 10. This liquid introducing flow path 42 is connected to a joint portion 43a provided on the housing 10. A liquid introducing pipe 45 is attached to the joint portion 43a by a coupler 44a. This liquid introducing pipe 45 forms a part of the liquid introducing flow path 42 and is connected to a liquid container portion for containing a photoresist liquid, i.e., a liquid tank 46. Therefore, the filter 41 is connected to the liquid tank 46 through the liquid introducing flow path 42 connected to the filter inlet 41a.

A pump inlet flow path 47 for guiding a liquid cleaned by the filter 41, into the pump chamber 17 is connected between a filter outlet 41b and a pump inlet 15a.

A liquid discharge flow path 48 is provided between a joint portion 43b and a pump outlet 16a provided on the housing 10. A liquid discharge pipe 49 is attached to the joint portion 43b by a coupler 44b. A nozzle 50 for coating a photoresist liquid on a semiconductor wafer is provided as a liquid discharge portion, at the top end of the liquid discharge pipe 49, as shown in FIG. 2.

An exhaust flow path 51 is connected to a vent port 41c of the filter 41, and this exhaust flow path 51 is connected to a joint portion 43c provided on the housing 10. An exhaust pipe 52 is attached to the joint portion 43c by a coupler 44c. In this manner, the air in the liquid captured by the filter 41 is externally exhausted through the exhaust pipe 52.

A return flow path 53 is connected between the liquid discharge flow path 48 with the liquid introducing flow path 42, so that the liquid discharged from the pump 11 into the liquid discharge flow path 48 is guided through the return flow path 53 into the liquid introducing flow path 42.

The liquid introducing flow path 42, the pump inlet flow path 47, the liquid discharge flow path 48, and the return flow path 53 which are formed in a block are integrally shaped together with the outlet-side adapter 16 and the like by a resin such as PFA and the like as described before. However, these paths 42, 47, 48, and 53 may be formed by hoses.

An open/close valve V1 is provided for opening/closing the liquid introducing flow path 42, and an open/close valve V2 is provided for opening/closing the exhaust flow path 51. An open/close valve V3 is provided for opening/closing the pump inlet flow path 47, and an open/close valve V4 is provided for opening/closing the return flow path 53. An open/close valve V5 is provided for opening/closing the liquid discharge flow path 48. Solenoid valves operating on the basis of electric signals, or air operate valves operating on the basis of air pressures can be used as the open/close valves V1 to V5. In the case shown in the figure, each of the open/close valves V1 to V5 is assembled in a block made of PFA. If each of the flow paths 42,47,48, and 53 described above is formed by a hose or the like, the valves V1 to V5 may be respectively attached to the hoses.

To control the operation of each of the open/close valves V1 to V5, an operation signal is transmitted from an external control section 56 through a connector 54 provided at the housing 10. To control the rotation of the motor 37, the external control section 56 is connected to the motor 37 through a connector 55 provided at the housing 10.

Figure 4:
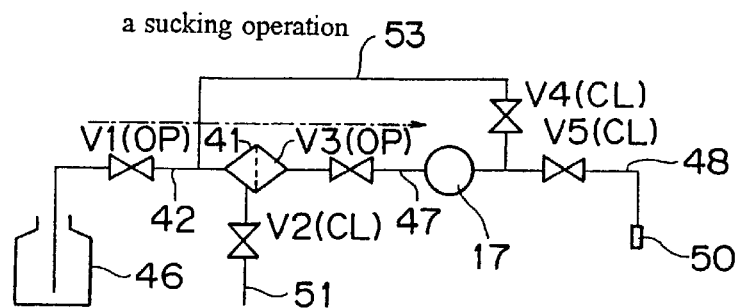
FIGS. 4A, 4B, and 4C are views showing steps of basic operation in case where a liquid is coated by the chemical liquid supply apparatus, respectively, FIG. 4A showing a sucking operation, FIG. 4B showing a discharging operation, and FIG. 4C showing a suck-back operation.
Figure 4:
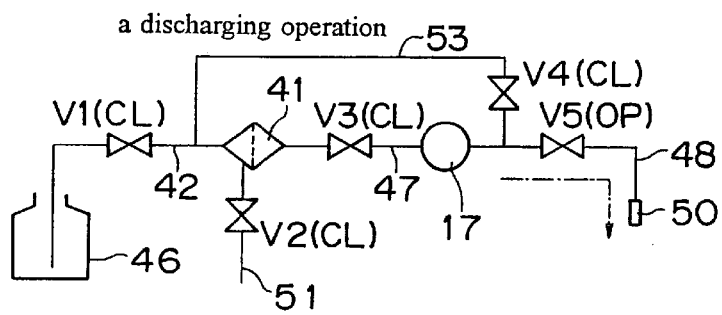
Figure 4:
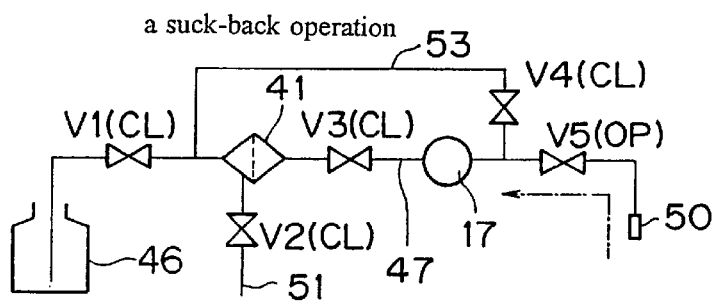

FIGS. 4A to 4C are diagrams showing steps of basic operation for coating a photoresist liquid from the nozzle 50 onto a semiconductor wafer by the chemical liquid supply apparatus. The reference "OP" means that an open/close valve is opened, and the reference "CL" means that an open/close valve is closed.

As shown in FIG. 4A, to coat a photoresist liquid, the motor 37 is driven so as to expand the pump chamber 17 under condition that the open/close valves V2, V4, and V5 are closed, the exhaust flow path 51, the return flow path 53, and the liquid discharge flow path 48 are closed, and further, the open/close valves V1 and V3 are opened so that the liquid introducing flow path 42 and the pump inlet flow path 47 are opened. That is, the operating disk portion 21 is shifted in such a direction that the length of the large bellows portion 23 in the bellows 14 is elongated. In this manner, the pump chamber 17 is expanded, so that the photoresist liquid in the liquid tank 46 is sucked into the pump chamber 17 through the filter 41.

After sucking operation or a sucking step is thus completed, the open/close valves V1 and V3 are closed and the open/close valve V5 is opened in order to close the pump inlet flow path 47. Under this condition, the motor 37 is driven so as to contract the pump chamber 17. That is, the operating disk portion 21 is shifted in such a direction that the length of the small bellows portion 22 is elongated. In this manner, since the pump chamber 17 is contracted, the photoresist liquid in the pump chamber 17 is discharged from the nozzle 50 and is coated onto the surface of a semiconductor wafer. In this discharging step or discharging operation, the open/close valve V1 may be opened.

After a predetermined amount of photoresist liquid is coated, operation of the pump 11 is stopped, and then, a suck-back operation or a suck-back step is carried out as shown in FIG. 4C. This suck-back operation is performed to prevent the liquid from dripping from the nozzle 50. The pump chamber 17 is driven so as to be expanded by keeping each of the open/close valves V1 to V5 under the same condition as that of FIG. 4B. Therefore, the photoresist liquid enters into the nozzle 50 and is prevented from dripping from the nozzle 50.

The pump 11 is thus provided on the downstream side of the filter 41, i.e., in the secondary side. So, in the case of the discharging operation for discharging the liquid from the nozzle 50, if the pump inlet flow path 47 is closed, no flow of the liquid is caused in the filter 41. And, in the only case of the sucking operation for supplying the liquid into the pump 17, flow of the liquid is caused in the filter 41. Thus, as the pump 17 is expanded by the controlled signal transmitted from the external control section 56, the liquid is sucked into the pump chamber 17 after permeating through the filter 41. And, as the pump 17 is contracted, the liquid is discharged from the pump outlet 16a. Therefore, according to the controlled signal, the pump operating speed for sucking the liquid and the speed for discharging the liquid can be differed from each other. According to varieties of the liquid, the permeating speed through the filter 41 and the discharging speed from the nozzle 50 can arbitrarily be set respectively.

Therefore, for example, according to varieties of the liquid, if time of the sucking operation is set longer than that of the discharging operation, the pump chamber 17 can slowly be expanded so that a flow rate at which the liquid permeates through the filter 41 per unit time is less than that at which the liquid is discharged from the nozzle 50 per unit time. So, even if an impure portion such as a gelled and solidified portion or air bubbles is included in the liquid contained in the liquid tank 46, only the liquid portions of the photoresist liquid except the impure portions can permeate through the filter 41.

Also, since no liquid flows into the filter 41 at the discharging operation, the discharged amount and the flow velocity of the liquid at the discharging operation can be controlled with high accuracy, without being influenced from pressure loss caused by the filter 41. That is, in a conventional apparatus, as the filter is provided on the secondary side of the pump, a pressure is generated between the pump and the filter at time of discharging a liquid. Due to this pressure, a housing of the filter, the pump, and the piping tubes swell, and the accuracy of the discharged amount deteriorates. On the other hand, the discharging operation of the liquid can be performed with high accuracy by providing the pump 11 in the secondary side of the filter 41.

This chemical liquid supply apparatus exhausts externally air contained in form of fine air bubbles of the liquid in the liquid tank 46, so that air exhausting operation can be effected.

Figure 5:
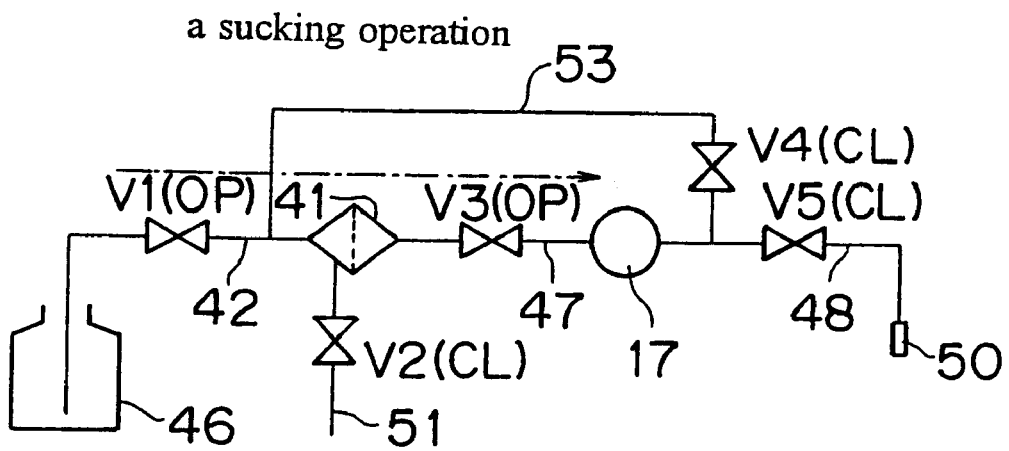
FIGS. 5A and 5B are views showing steps of air bleeding operation for removing air bubbles form a liquid, FIG. 5A showing a sucking operation, and FIG. 5B showing an exhausting operation.
Figure 5:
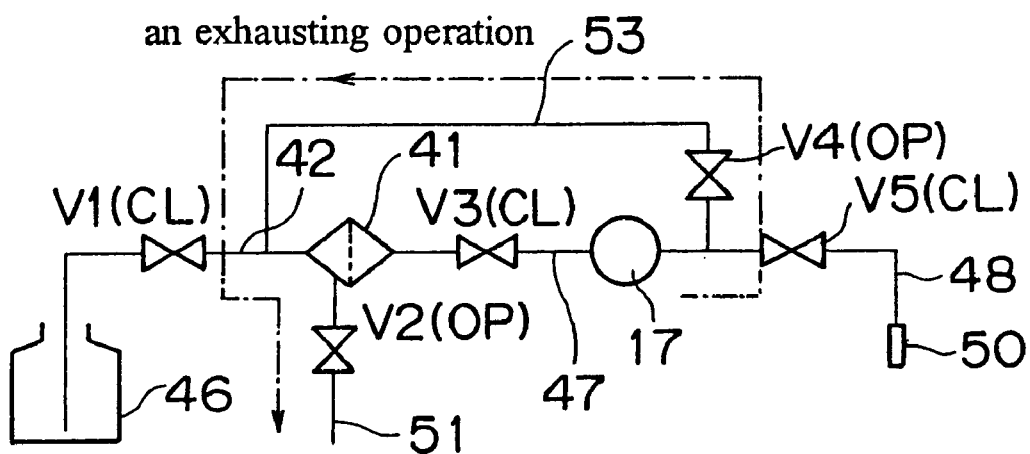

FIGS. 5A and 5B are views showing steps of air exhausting operation for removing air in the liquid. FIG. 5A shows the sucking operation by which each of the open/close valves V1 to V5 is operated under the same condition as that of FIG. 4A. Under condition that the return flow path 53 and the liquid discharge flow path 48 are closed, the pump chamber 17 is expanded in order to suck the liquid in the liquid tank 46 into the pump chamber 17 through the filter 41.

Subsequently, the exhausting operation shown in FIG. 5B or an exhausting step is carried out. In this exhausting operation, the vent port 41c is opened by opening the open/close valve V2 provided in the exhaust flow path 51, and the return flow path 53 is opened by opening the open/close valve V4. Further, the liquid introducing flow path 42 and the pump inlet flow path 47 are respectively closed by closing the open/close valves V1 and V3. Under this condition, the pump chamber 17 is contracted. In this manner, the liquid in the pump chamber 17 flows through the return flow path 53 and returns on the side of the filter 41, so that the air captured in the filter 41 is externally exhausted from the vent port 41c through the exhaust flow path 51.

The air captured in the filter 41 is securely exhausted to the outside by repeating the sucking operation shown in FIG. 5A and the exhausting operation shown in FIG. 5B. Therefore, when a new liquid tank 46 is attached to the chemical liquid supply apparatus shown in FIG. 1, the air exhausting operation shown in FIGS. 5A and 5B is repeated predetermined times so as to be ready to perform the discharging operation of the liquid shown in FIGS. 4A to 4B. Also, before performing the discharging operation shown in FIG. 4B, the sucking operation and the exhausting operation shown in FIGS. 5A and 5B are repeated a plurality of times, so that air can be prevented from entering into the liquid discharged from the nozzle 50.

Figure 6:
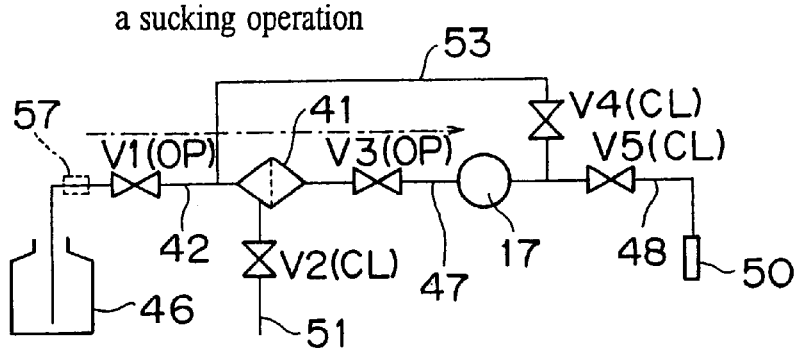
FIGS. 6A, 6B, and 6C are views showing steps of circulation filtering operation for removing foreign materials from a liquid with high accuracy, respectively, FIG. 6A showing a sucking operation, FIG. 6B showing a feedback operation, and FIG. 6C showing a re-sucking operation.
Figure 6:
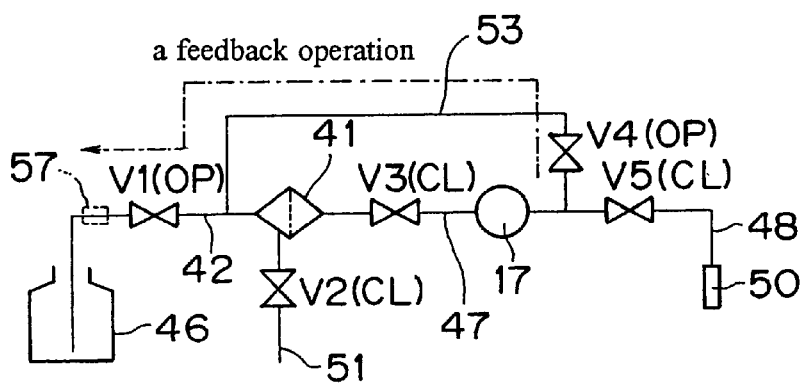
Figure 6:
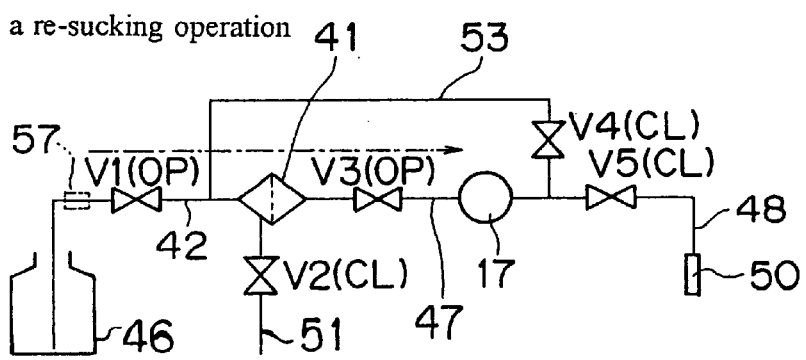

FIGS. 6A and 6B are views showing the steps of the circulation filtering operation for removing an impure portion in the liquid with high accuracy. FIG. 6A shows the sucking operation by which each of the open/close valves V1 to V5 is operated under the same condition as that of FIG. 4A. Under the condition that the return flow path 53 and the liquid discharge flow path 48 are closed, the pump chamber 17 is expanded in order to suck the liquid in the liquid tank 46 into the pump chamber 17 through the filter 41.

Subsequently, a feedback operation or a feedback step shown in FIG. 6B is carried out. In this feedback operation, the pump chamber 17 is contracted under the condition that the return flow path 53 and the liquid introducing flow path 42 are opened and the liquid discharge flow path 48 and the pump inlet flow path 47 are closed. As a result of this, the liquid in the pump chamber 17 is returned on the side of the liquid introducing flow path 42.

In order to make the returned liquid permeate through the filter 41, thereby filtering the returned liquid again, a re-sucking operation shown in FIG. 6(C) is carried out. In this re-sucking operation, the open/close valves V1 to V5 are brought into the same condition as that of the sucking operation. As the liquid returned on the side of the liquid introducing flow path 42 by means of the feedback operation is a liquid which has permeated through the filter 41, the returned liquid has been cleaned by the filter 41. Since this liquid is cleaned again by the filter 41 by re-sucking operation, an extent of cleanliness of the liquid to be discharged is improved. By repeating the feedback operation and the re-sucking operation a plurality of times after the sucking operation shown in FIG. 6A, the processing of removing impure portions contained in the liquid is performed a plurality of times, so that an extent of cleanliness of the liquid can be improved by far.

The liquid is returned on the side of the liquid introducing flow path 42 through the return flow path 53 by the feedback operation shown in FIG. 6B. On the other hand, if the volume of the liquid introducing flow path 42 and the liquid introducing pipe 45 is enlarged in comparison with the amount of the liquid returned by one time of pumping operation, the liquid returned by the feedback operation does not reach the liquid tank 46 but stays in the flow path.

However, if the length of the flow path of the liquid introducing pipe 45 is short, a buffer tank 57 shown in FIG. 6A to 6C having a volume larger than the liquid amount of the liquid returned by one time of the pumping operation may be provided at the liquid introducing flow path 42. In case of returning the liquid into the liquid tank 46, the liquid in the liquid tank 46 is circulated so that the liquid in the liquid tank 46 can be directly filtered by the circulation filtering operation shown in FIGS. 6A to 6C.

The photoresist liquid is coated onto a semiconductor wafer by a first discharging operation as shown in FIG. 4B, and then another new semiconductor wafer by a second discharging operation. So, there is a predetermined waiting time for replacing the semiconductor wafer after the first operation, with the new semiconductor wafer before the second operation. By repeating the air exhausting operation shown in FIGS. 5A and 5B and the circulation filtering operation shown in FIGS. 6A to 6C a plurality of times during the waiting time, impure portions such as air bubbles and gelled portions contained in the photoresist liquid can be securely removed, so that an integrated circuit formed on the semiconductor wafer can be manufactured with good yield.

Figure 7A:
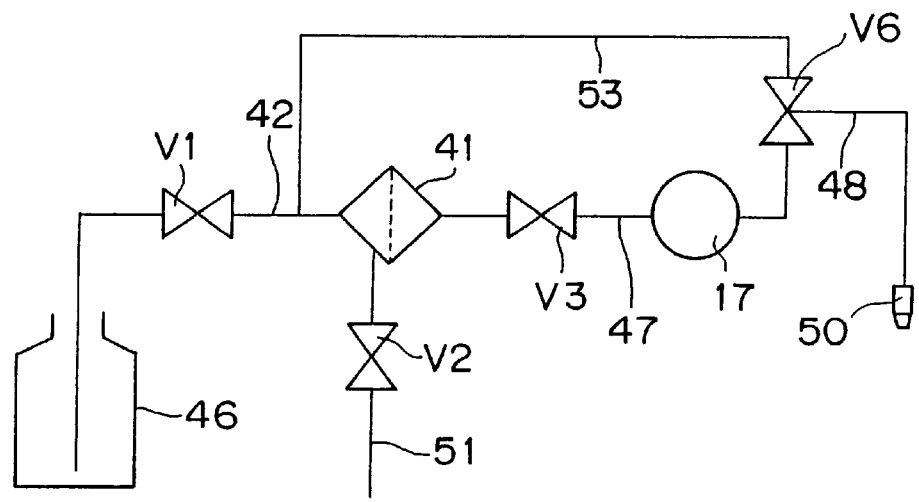
FIGS. 7A and 7B are liquid circuit diagrams schematically showing the flow of the liquid in the chemical liquid supply apparatuses as another embodiments of the present invention, respectively, FIG. 7A showing a case that both of the return flow path and the liquid discharging flow path are opened/closed by one three-way valve, and FIG. 7B showing a case that two non-return valves or check valves are used instead of two valves shown in FIG. 2.

FIG. 7A is a liquid circuit diagram showing a chemical liquid supply apparatus as another embodiment of the present invention. In the case shown in FIG. 2, the return flow path 53 and the liquid discharge flow path 48 are opened/closed by the open/close valves V4 and (or) V5, respectively. In the present case, both of the flow paths are opened/closed by one three-way valve V6. The operation of this case is equal to that of case described above.

Figure 7B:
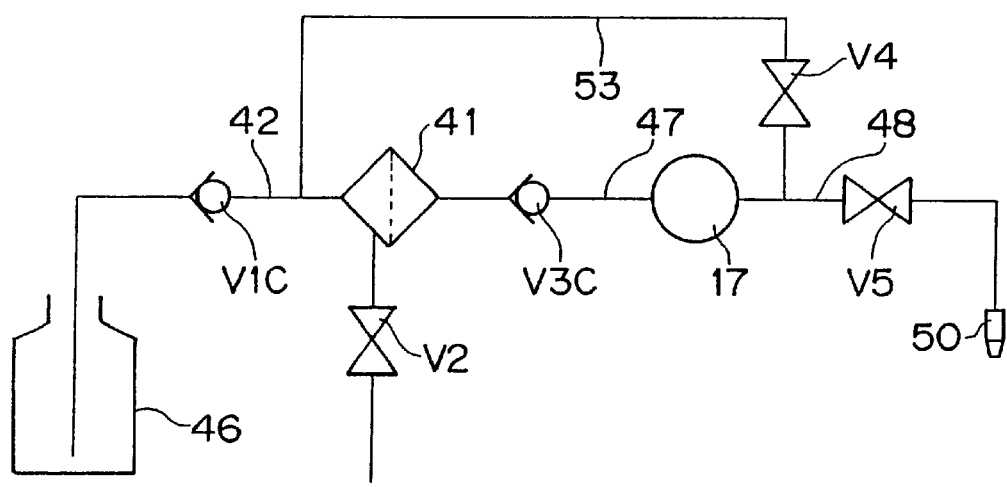

FIG. 7B is a liquid circuit diagram showing a chemical liquid supply apparatus as another embodiment of the present invention. In the case shown in FIG. 2, the open/close valves V1 and V3 for opening/closing the liquid introducing flow path 42 and the pump inlet flow path 47 are respectively operated by signals from a control section. However, in FIG. 7B, non-return valves or check valves V1c and V3c are used instead of the valves V1 and V3. In this case, although the circulation filtering operation cannot be performed, the air exhausting operation can be performed.

Figure 8:
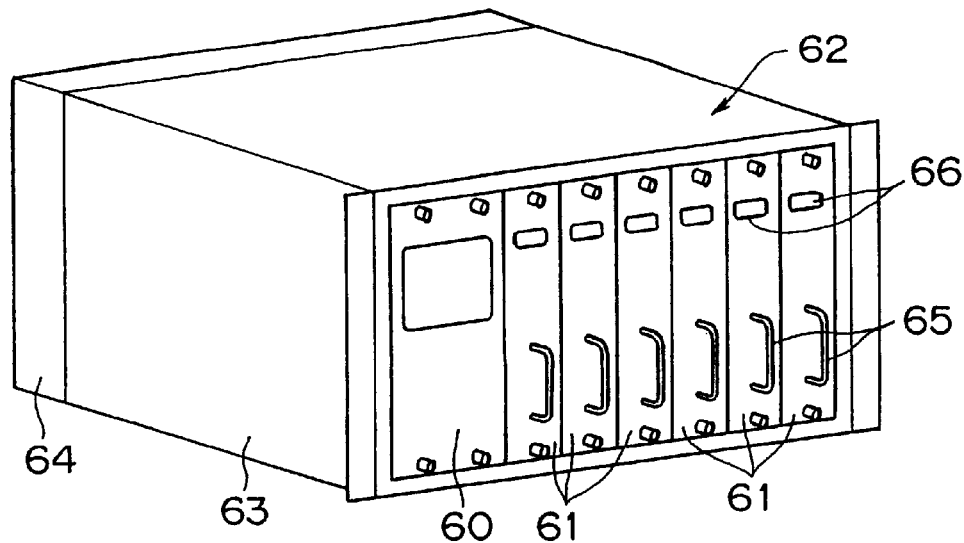
FIG. 8 is a perspective view showing a front side of a chemical liquid supply apparatus as another embodiment of the present invention.
Figure 9:
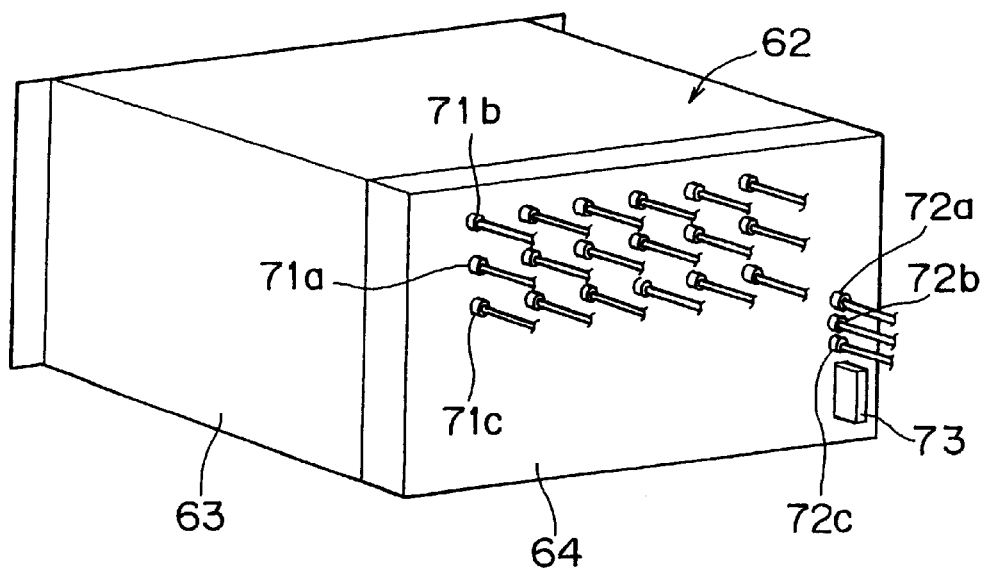
FIG. 9 is a perspective view showing a back side of the apparatus shown in FIG. 8.

FIG. 8 is a perspective view showing the front side of a chemical liquid supply apparatus. In the apparatus, each of six chemical liquid supply units 61 included in a chemical liquid supply apparatus shown in FIG. 1 is detachably assembled in an integrated holding member such as a rack, a case 62, or the like. FIG. 9 is a perspective view showing the back side of the apparatus. The case 2 has the case body 63 consisting of a bottom wall portion, left and right side wall portions, and a ceiling portion. A control unit 60 and six chemical liquid supply units 61 are provided in this case body 63. A mother board 64 shown in FIG. 9 is provided on the back side of the case body 63. The case 62 as this integrated holding member can be constructed without limitation of the structure shown in the figures by using various members such a frame material and the like, or constructed by anything that can integrate or stack a plurality of chemical liquid supply units 61 on the mother board 64.

Figure 10:
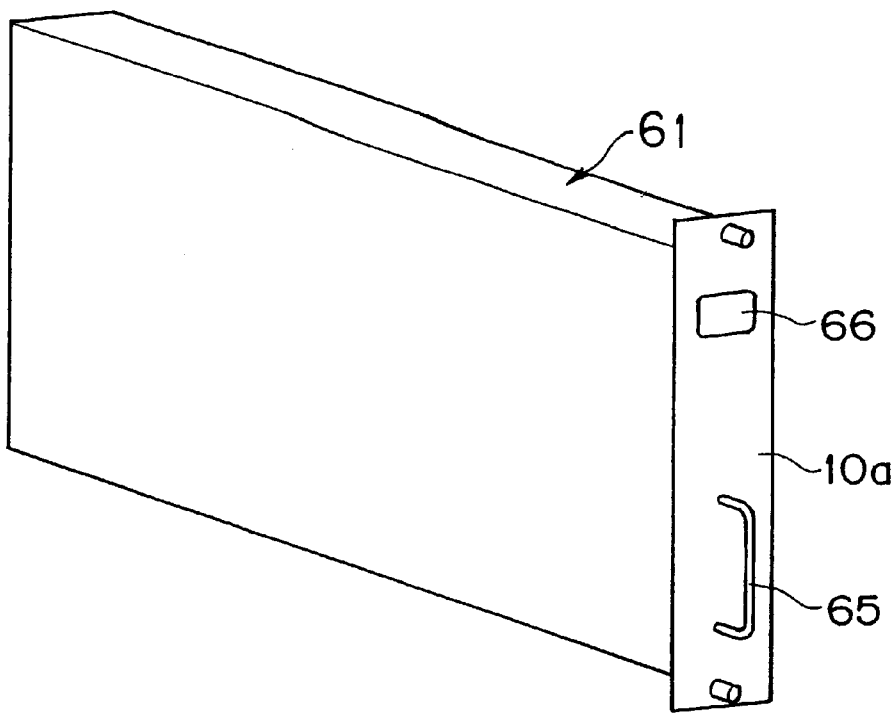
FIG. 10 is a perspective view showing a front side of a chemical liquid supply unit provided in the chemical liquid supply apparatus.
Figure 11:
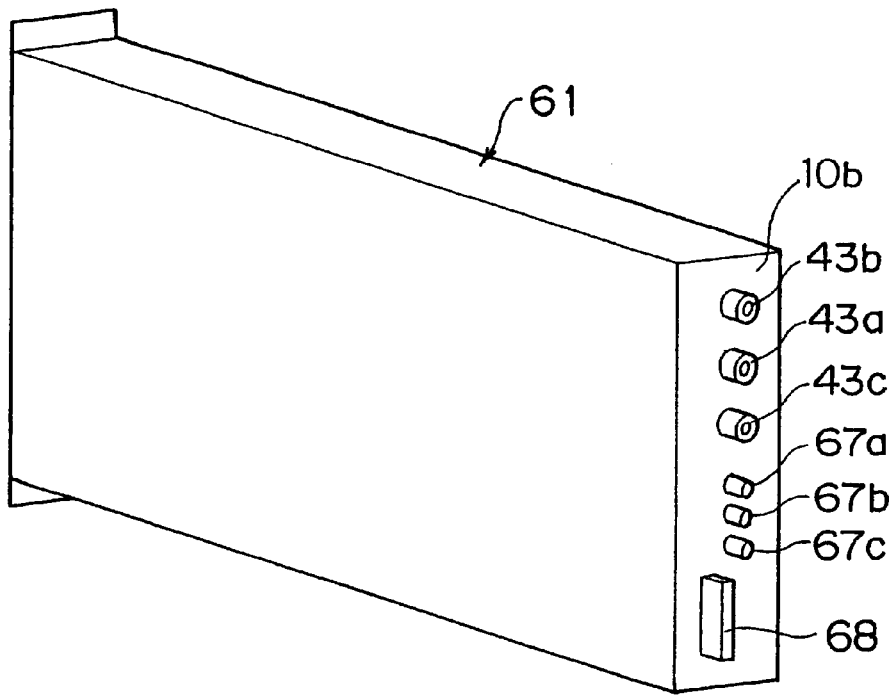
FIG. 11 is a perspective view showing a back side of the unit shown in FIG. 10.
Figure 12:
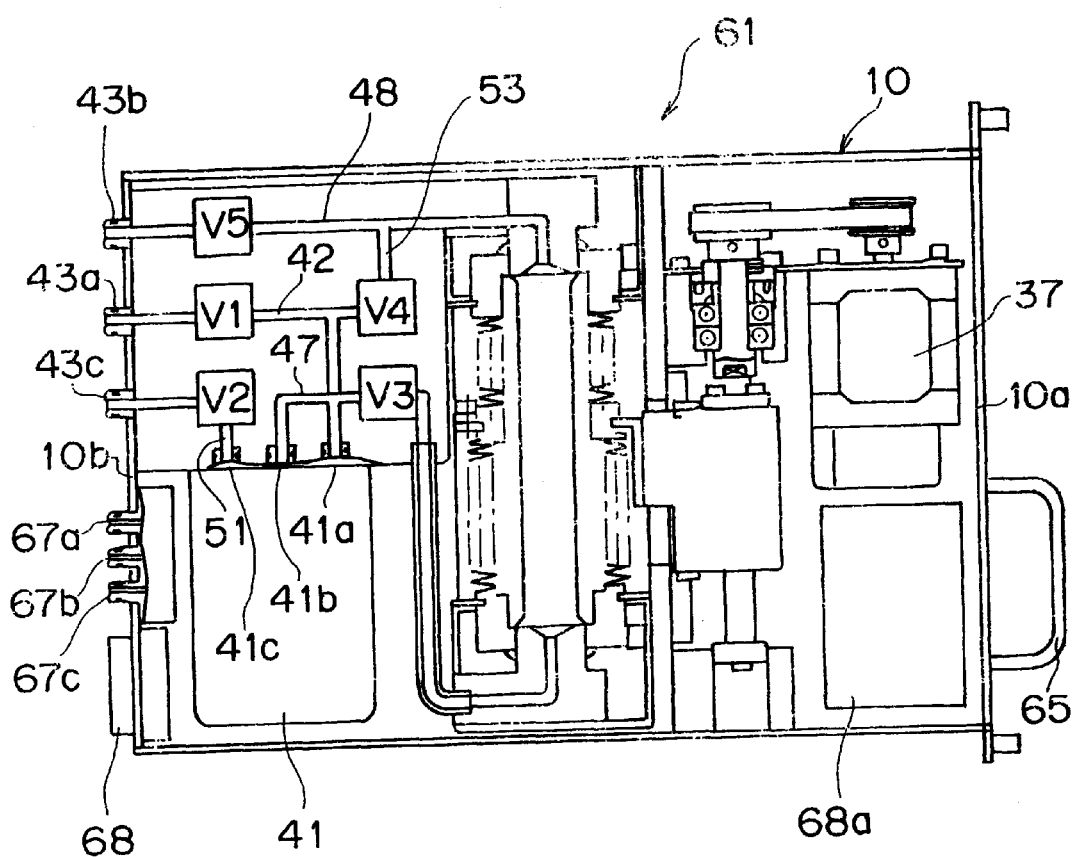
FIG. 12 is a cross-sectional view of the unit shown in FIG. 10.

FIG. 10 is a perspective view showing the front side of each of the six chemical liquid supply units 61. FIG. 11 shows the back side thereof. FIG. 12 is a cross-sectional view thereof. The internal structure of each of the six chemical liquid supply units 61 is substantially equal to that of the chemical liquid supply apparatus shown in FIG. 1. A handle 65 and a display section 66 are provided on a plate 10a on the front side of the housing 10. Joint portions 43a to 43c corresponding to the liquid introducing flow path 42, the liquid discharge flow path 48, and the exhaust flow path 51 are provided on a plate 10b on the back side.

Piping connecting portions 67a to 67c for supplying and exhausting air or a $N_2$ gas, and a connector 68 for transmitting power and control signals for operating the motor 37 and open/close valves V1 to V5 are further provided on the plate 10b on the back side. As shown in FIG. 12, an electric equipment portion 68a with a controlling device for controlling the operation of the motor 37 and open/close valves V1 to V5 is formed in the housing 10.

Meanwhile, joint portions 71a to 71c connected to the flow paths corresponding to the joint portions 43a to 43c of each of the six chemical liquid supply units 61 shown in FIG. 9, respectively. are provided on the mother board 64. Common piping connecting ports 72a to 72c are provided on the piping connecting portion 67a to 67c, respectively. A common connector 73 electrically connected to an electric equipment portion 68a and a control unit 60 is further provided on the mother board 64.

Therefor, each of the six chemical liquid supply units 61 becomes a usable state by following connections. That is, the joint portions 43a to 43c of each of the six chemical liquid supply units 61 inserted into the case 62 are respectively connected to the joint portions 71a to 71c of the mother board 64, and the piping connecting portions 67a to 67c are respectively to the piping connecting ports 72a to 72c, and the common connector 68 of each of the chemical liquid supply units 61 is connected to the common connector 73.

In the pre-steps for manufacturing a semiconductor integrated circuit device, one same processing liquid is supplied through a plurality of systems, and various processing liquids are coated onto the semiconductor wafer, in addition to a photoresist liquid. Conventionally, each of above processing liquids is supplied by separate chemical liquid supply apparatuses. Therefore, since connection of pipes and wires to each chemical liquid supply apparatus is used in common by means of a terminal board or the like, the pipes and wires are entangled in each other. So, the device has a complicated and troublesome structure. However, in the chemical liquid supply apparatus shown in FIGS. 9 to 12, the chemical liquid supply apparatus is constructed as a unit and is detachably attached in the case 62, so that several lines that can be used in common among various lines such as power lines, signal lines, gas lines, liquid lines, and the like can be provided in form of one system with respect to the mother board 64. In this manner, the piping and wiring used in the apparatus for manufacturing a semiconductor integrated circuit device can be simplified, so that the reliability of the piping and wiring can be improved.

Further, the front and back surfaces of the six chemical liquid supply units 61 inserted into the case 62 are flat respectively, so that the operatability of each of the six chemical liquid supply units 61 is improved. Also, piping and wiring of each of the six chemical liquid supply units 61 are concentrated on the back side thereof, so that the space on the front and back side thereof is available efficiently.

Since each of the six chemical liquid supply units 61 is detachable from the case 62, periodic inspection of each of the units 61 or replacement or repair of the filter 41 can easily be performed by detaching each of the units 61 from the apparatus, and thereby the apparatus can be operated again after a short period. In addition, if a unit for replacement is prepared, only the stopping time of the manufacturing line can be shortened by just operation for repairing the unit. So, preparing a unit for replacement has the advantages in case where the manufacturing apparatus is continuously operated for 24 hours.

Needless to say, the present invention is not limited to the embodiments described above but can be variously modified without deviating from the score of the essential points of the invention.

For example, although the above explanation has been made of the case where the chemical liquid supply apparatus is used to coat a photoresist liquid onto a semiconductor wafer, the present invention is applicable not only to supply of a resist liquid but also various liquids. In particular, the present invention is advantageous in case where a liquid permeates through a filter and then is discharged onto the semiconductor wafer, the liquid containing a substance which is easily crystallized, or a liquid which easily causes bubbles.

In addition, except for the pump shown in FIG. 3, the pump may be of a diaphragm type if the pump is of a variable volume type. In the chemical liquid supply apparatus shown in FIG. 8, the number of the six chemical liquid supply units 61 detachably attached to the case 62 may be arbitrarily changed without limitation of the case shown in the figures.

What is claimed is:

1. A chemical liquid supply method using a chemical liquid supply apparatus including a filter communicating with a liquid container portion through a liquid introducing flow path connected to a filter inlet, a pump having a pump chamber which is connected to a filter outlet through a pump inlet flow path and is expanded/contracted, a liquid discharge portion connected to a pump outlet through a liquid discharge flow path, and a return flow path which returns a liquid discharged from the pump, to a side of the liquid introducing flow path, the filter having a vent port, and there being a first valve in the liquid introducing flow path, a second valve in an exhaust flow path connected to the vent port, a third valve in the pump inlet flow path, a fourth valve in the return flow path, and a fifth valve in the liquid discharge flow path, the chemical liquid supply method comprising:

a sucking step of expanding the pump chamber, thereby sucking a liquid contained in the liquid container portion, into the pump chamber through the filter, under the condition that the fourth and fifth valves are closed;

an exhausting step of contracting the pump chamber, thereby directly returning the liquid contained in the pump chamber to a side of the filter for exhausting externally air contained in the filter, under condition that the second and fourth valves are opened and the first, third and fifth valves are closed; and a discharging step of contracting the pump chamber, thereby discharging the liquid from the liquid discharge portion, under the condition that the second and third valves are closed.

2. A chemical liquid supply method according to claim 1, wherein the discharging step is carried out after the sucking step and the exhausting step are repeated a plurality of times.

3. A chemical liquid supply method using a chemical liquid supply apparatus including a filter communicating with a liquid container portion through a liquid introducing flow path connected to a filter inlet, a pump having a pump chamber which is connected to a filter outlet through a pump inlet flow path and is expanded/contracted, a liquid discharge portion connected to a pump outlet through a liquid discharge flow path, and a return flow path which returns a liquid discharged from the pump to a side of the liquid introducing flow path, the filter having a vent port, and there being a first valve in the liquid introducing flow path, a second valve controlling flow through the vent valve a third valve in the pump inlet flow path, a fourth valve in the return flow path, and a fifth valve in the liquid discharge flow path, the chemical liquid supply method comprising:

a sucking step of expanding the pump chamber, thereby sucking a liquid contained in the liquid container portion, into the pump chamber through the filter, under the condition that the fourth and fifth valves are closed;

a feedback step of contracting the pump chamber, thereby feeding back the liquid contained in the pump chamber to a side of the liquid introducing flow path, under the condition that the first and fourth valves are opened and the third and fifth valves are closed:

a re-sucking step of expanding the pump chamber, thereby sucking the liquid fed back in the liquid introducing flow path again through the filter into a side of the pump chamber, under the condition that the fourth and fifth valves are closed; and a discharging step of contracting the pump chamber, thereby discharging the liquid from the liquid discharge portion, under the condition that the second and third valves are closed.

4. A chemical liquid supply method according to claim 3, wherein the feedback step and the re-sucking step are repeated between the discharging step and a next discharging step thereof which are carried out at a predetermined interval.

5. A chemical liquid supply method using a chemical liquid supply apparatus including a filter communicating with a liquid container portion through a liquid introducing flow path connected to a filter inlet, a pump having a pump chamber which is connected to a filter outlet through a pump inlet flow path and is expanded/contracted, a liquid discharge portion connected to a pump outlet through a liquid discharge flow path, and a return flow path which returns a liquid discharged from the pump, to a side of the liquid introducing flow path the filter having a vent port, and there being a first valve in the liquid introducing flow path, a second valve in an exhaust flow path connected to the vent port, a third valve in the pump inlet flow path, a fourth valve in the return flow path, and a fifth valve in the liquid discharge flow path, the chemical liquid supply method comprising:

a sucking step of expanding the pump chamber, thereby sucking a liquid contained in the liquid container portion into the pump chamber through the filter, under the condition that the fourth and fifth valves are closed;

an exhausting step of contracting the pump chamber, thereby directly returning the liquid contained in the pump chamber to a side of the filter for exhausting externally air contained in the filter, under the condition that the second and fourth valves are opened and the first, third and fifth valves are closed;

a discharging step of contracting the pump chamber, thereby discharging the liquid from the liquid discharge portion, under the condition that the third and fourth valves are closed; and a suck-back step of expanding the pump chamber, thereby returning the liquid into the liquid discharge portion, under the condition that the fifth valve is opened after carrying out the discharging step.

6. A chemical liquid supply apparatus comprising:

a pump having a pump chamber which is expanded/contracted, means for operating the pump comprising means for sucking a liquid from a pump inlet into the pump chamber through an open third valve in a pump inlet flow path connected to the pump inlet when the pump chamber is expanded, and discharging the liquid from a pump outlet when the pump chamber is contracted and the third valve is closed;

a filter having a filter inlet and a filter outlet, the filter inlet communicating with a liquid container portion containing the liquid through a liquid introducing flow path, and the filter outlet being connected to the pump inlet flow path;

a liquid discharge portion connected to a liquid discharge flow path connected to the pump outlet, for discharging the liquid through an open fifth valve in the liquid discharge portion; and control means for independently controlling a pump operation speed of expanding the pump chamber to suck a liquid passing through the filter toward the pump chamber, and a pump operation speed of contracting the pump chamber to discharge the liquid from the pump outlet.

7. A chemical liquid supply apparatus according to claim 6, further comprising a return flow path with a fourth valve for returning the liquid discharged from the pump into a side of the filter, wherein the liquid is returned into the filter through the return flow path when the fifth valve is closed and the fourth valve is open, and thereby air captured in the filter is exhausted externally through a filter vent flow path having an open second valve.

8. A chemical liquid supply apparatus according to claim 6, further comprising a return flow path with a fourth valve for returning the liquid discharged from the pump into a side of the filter, wherein after the liquid is fed back into a side of the liquid introducing flow path through the return flow path, the liquid fed back permeates again through the filter, thereby circulating and filtering the liquid.

9. A chemical liquid supply apparatus comprising:

a pump having a pump chamber which is expanded/contracted, sucking a liquid from a pump inlet into the pump chamber when the pump chamber is expanded, and discharging the liquid from a pump outlet when the pump chamber is contracted;

a filter having a filter inlet and a filter outlet, the filter inlet communicating with a liquid container portion containing the liquid through a liquid introducing flow path, and the filter outlet being connected to a pump inlet flow path connected to the pump inlet;

a liquid discharge portion connected to a liquid discharge flow path connected to the pump outlet, for discharging the liquid;

control means for independently controlling a pump operation speed of expanding the pump chamber to suck a liquid passing through the filter toward the pump chamber, and a pump operation speed of contracting the pump chamber to discharge the liquid from the pump outlet;

chemical liquid supply units in which the pump, the filter, and a pump drive section for driving the pump are incorporated; and a mother board provided with a flow path connecting portion which is connected to a joint portion of each of a liquid introducing flow path, a liquid discharge flow path, and an exhaust flow path, which are provided for each of the chemical liquid supply units, wherein each of the chemical liquid supply units can be integrally attached to the mother board.

10. An chemical liquid apparatus according to claim 9, wherein a pipe connecting port connected in common to a pipe connecting portion provided for each of the chemical liquid supply units is provided on the mother board, and a common connector connected in common to a connector electrically connected to an electric equipment portion in each of the chemical liquid supply units is provided on the mother board.

11. A chemical liquid supply apparatus comprising:

a pump having a pump chamber which is expanded/contracted, sucking a liquid from a pump inlet into a pump chamber when the pump chamber is expanded, and discharging the liquid from a pump outlet when the pump chamber is contracted;

a filter having a filter inlet and a filter outlet, the filter inlet communicating with a liquid container portion containing the liquid through a liquid introducing flow path, and the filter outlet being connected to a pump inlet flow path connected to the pump inlet;

a liquid discharge portion connected to a liquid discharge flow path connected to the pump outlet, for discharging the liquid;

a return flow path for returning the liquid discharged from the pump into a side of the filter, and a three-way valve connected to the pump outlet, the liquid discharge portion and the return flow path, said three-way valve having a first position at which the pump outlet, the liquid discharge portion and the return flow path are closed by the valve, a second position at which the discharge portion is closed and said pump outlet and said return flow path are connected to one another by the valve, and a third position at which the return flow path is closed by the valve and the pump outlet and the discharge portion are connected to one another.

* * * * *